US007713903B2

(12) United States Patent
Lockemeyer et al.

(10) Patent No.: US 7,713,903 B2
(45) Date of Patent: May 11, 2010

(54) CARRIER, A PROCESS FOR PREPARING THE CARRIER, AN OLEFIN EPOXIDATION CATALYST, A PROCESS FOR PREPARING THE CATALYST, AND A PROCESS FOR THE PRODUCTION OF AN OLEFIN OXIDE, A 1,2-DIOL, A 1,2-DIOL ETHER, OR AN ALKANOLAMINE

(75) Inventors: John Robert Lockemeyer, Sugar Land, TX (US); Jian Lu, Bellaire, TX (US); Nga Thi-Huyen Vi, Katy, TX (US)

(73) Assignee: Shell Oil Company, Houston, TX (US)

( * ) Notice: Subject to any disclaimer, the term of this patent is extended or adjusted under 35 U.S.C. 154(b) by 2 days.

(21) Appl. No.: 12/197,940

(22) Filed: Aug. 25, 2008

(65) Prior Publication Data

US 2009/0264678 A1   Oct. 22, 2009

Related U.S. Application Data

(60) Provisional application No. 60/968,144, filed on Aug. 27, 2007.

(51) Int. Cl.
*B01J 21/02* (2006.01)
*C07D 301/06* (2006.01)
*C07D 301/08* (2006.01)
*C07D 301/10* (2006.01)
*C07C 31/18* (2006.01)
*C07C 213/02* (2006.01)
*C07C 213/04* (2006.01)

(52) U.S. Cl. ............... 502/202; 502/203; 549/532; 549/533; 549/534; 564/475; 568/680; 568/853

(58) Field of Classification Search ............... None
See application file for complete search history.

(56) References Cited

U.S. PATENT DOCUMENTS

| 2,422,884 | A | * | 6/1947 | Burgin ............... 585/671 |
| 4,761,394 | A | | 8/1988 | Lauritzen ............ 502/348 |
| 4,766,105 | A | | 8/1988 | Lauritzen ............ 502/216 |
| 4,845,296 | A | | 7/1989 | Ahmed et al. ........ 564/477 |
| 5,600,054 | A | * | 2/1997 | Miglio et al. ........ 585/671 |
| 5,663,385 | A | | 9/1997 | Kemp ............... 549/536 |
| 5,739,075 | A | | 4/1998 | Matusz ............. 502/302 |
| 6,368,998 | B1 | | 4/2002 | Lockemeyer ......... 502/34 |
| 6,579,825 | B2 | | 6/2003 | Lockemeyer ........ 502/347 |
| 6,656,874 | B2 | | 12/2003 | Lockemeyer ........ 502/347 |
| 6,858,560 | B2 | | 2/2005 | Rizkalla ............ 502/202 |
| 2003/0162984 | A1 | | 8/2003 | Lockemeyer et al. ... 549/534 |

FOREIGN PATENT DOCUMENTS

| EP | 3642 | 8/1979 |
| EP | 266015 | 5/1988 |
| GB | 1571123 | 7/1980 |
| WO | WO0015333 | 3/2000 |
| WO | WO0015334 | 3/2000 |
| WO | WO0015335 | 3/2000 |
| WO | WO2006133183 | 12/2006 |
| WO | WO2008054564 | 8/2008 |

OTHER PUBLICATIONS

"Kirk-Othmer Encyclopedia of Chemical Technology", $3^{rd}$ edition, vol. 9, 1980, pp. 445-447.
B.E.T. (Brunauer, Emmett and Teller) method as described in Journal of the American Chemical Society 60 (1938) pp. 309-316.

* cited by examiner

*Primary Examiner*—Brian J Davis

(57) ABSTRACT

A carrier that may be used in the manufacture of an olefin epoxidation catalyst is provided that is prepared from a process involving depositing boron on the carrier and subsequently calcining the carrier. Also provided is an olefin epoxidation catalyst comprising a silver component deposited on such a calcined carrier. Also provided is a process for the epoxidation of an olefin employing such a catalyst and a process for producing a 1,2-diol, a 1,2-diol ether, or an alkanolamine employing the olefin oxide.

30 Claims, No Drawings

CARRIER, A PROCESS FOR PREPARING THE CARRIER, AN OLEFIN EPOXIDATION CATALYST, A PROCESS FOR PREPARING THE CATALYST, AND A PROCESS FOR THE PRODUCTION OF AN OLEFIN OXIDE, A 1,2-DIOL, A 1,2-DIOL ETHER, OR AN ALKANOLAMINE

REFERENCE TO PRIOR APPLICATIONS

This application claims the benefit of U.S. Provisional Application No. 60/968,144 filed on Aug. 27, 2007, which is incorporated herein by reference in its entirety.

FIELD OF THE INVENTION

The invention relates to a carrier for use in preparing an olefin epoxidation catalyst, a process for preparing the carrier, an olefin epoxidation catalyst, and a process for preparing the catalyst. The invention also relates to a process for the epoxidation of an olefin employing the catalyst. The invention also relates to processes for using the olefin oxide so produced for preparing a 1,2-diol, a 1,2-diol ether, or an alkanolamine.

BACKGROUND OF THE INVENTION

In olefin epoxidation, a feed containing an olefin and an oxygen source is contacted with a catalyst under epoxidation conditions. The olefin is reacted with oxygen to form olefin oxide. A product mix results that contains olefin oxide and typically unreacted feed and combustion products, including carbon dioxide. The olefin oxide, thus produced, may be reacted with water to form a 1,2-diol, with an alcohol to form a 1,2-diol ether, or with an amine to form an alkanolamine. Thus, 1,2-diols, 1,2-diol ethers, and alkanolamines may be produced in a multi-step process initially comprising olefin epoxidation and then the conversion of the formed olefin oxide with water, an alcohol, or an amine.

Olefin epoxidation catalysts generally comprise silver, usually with one or more additional elements deposited therewith, on a formed carrier. Carriers are typically formed of a refractory material, such as alpha-alumina. In general, higher purity alpha-alumina has been found to correlate with better performance.

Such catalysts are commonly prepared by a method involving impregnating or coating the formed carrier particles with a solution comprising a silver component and possibly other dopants. The carrier is commonly prepared by forming particles from a dough or paste comprising the carrier material or a precursor thereof and calcining the particles at a high temperature, commonly at a temperature in excess of 900° C.

The performance of the catalysts may be assessed on the basis of selectivity, activity, and stability of operation in the olefin epoxidation. The selectivity is the molar fraction of the converted olefin yielding the desired olefin oxide. As the catalyst ages, the fraction of olefin converted normally decreases with time. To maintain a desired constant level of olefin oxide production, the temperature of the reaction generally is increased. However, increasing the temperature generally causes the selectivity of the reaction to the desired olefin oxide to decrease. In addition, the equipment used in the reactor typically may tolerate temperatures only up to a certain level. Thus, it may become necessary to terminate the reaction when the reaction temperature reaches a temperature inappropriate for the reactor. Thus, the longer the selectivity may be maintained at a high level and the epoxidation may be performed at an acceptably low reaction temperature while maintaining an acceptable level of olefin oxide production, the longer the catalyst charge may be kept in the reactor and the more product is obtained. Quite modest improvements in the maintenance of selectivity, activity, and stability of operation over long periods may yield huge dividends in terms of process efficiency.

Over the years, much effort has been devoted to improving the performance of olefin epoxidation catalysts. Such efforts have been directed toward improvements to initial activity and selectivity, and to improved stability performance, that is the resistance of the catalyst against aging-related performance decline. In certain instances, improvements have been sought by altering the compositions of the catalysts. In other instances, improvements have been sought by altering the processes for preparing the catalysts, including altering the composition of the carrier and the process for obtaining the carrier.

For example, U.S. Pat. No. 6,858,560-B2 generally discloses a catalyst for the production of ethylene oxide containing silver and a promoting amount of an alkali metal component together with a sulfur component and a boron component. The catalyst is essentially free of rhenium and transition metal components. U.S. Pat. No. 5,663,385 generally discloses an ethylene oxide catalyst comprising silver, a promoting amount of alkali metal, a promoting amount of rhenium, and a promoting amount of a rhenium co-promoter selected from phosphorous, boron, and mixtures thereof, supported on a carrier. GB-1571123 generally discloses a catalyst for the production of alkylene oxides comprising silver, a promoting amount of alkali metal, and a catalyst-life enhancing amount of silicon or aluminum and/or a compound of boron deposited on a porous heat resisting support. These patents do not disclose any benefits obtainable as a result of the order in which boron is added to the carrier/catalyst or the procedures and conditions for such addition.

Not withstanding the improvements already achieved, there is a desire to further improve the performance of olefin epoxidation catalysts.

SUMMARY OF THE INVENTION

The present invention provides a process for the preparation of a catalyst comprising: depositing boron on a carrier; subsequently calcining the carrier; and depositing silver on the calcined carrier. In an embodiment, boron is deposited on the carrier in a quantity of at least about 200 ppmw boron, based on the weight of the carrier, and the process additionally comprises depositing a high-selectivity dopant on the calcined carrier. In another embodiment, boron is deposited on the carrier in a quantity of at least about 1000 ppmw boron, based on the weight of the carrier. The present invention also provides a catalyst prepared by such a process.

The present invention also provides a process for the preparation of a carrier comprising: depositing boron on a carrier; and subsequently calcining. The present invention also provides a carrier prepared by such a process.

The present invention also provides a process for the epoxidation of an olefin comprising reacting the olefin with oxygen in the presence of a catalyst prepared in accordance with the present invention.

The present invention also provides a process for the production of a 1,2-diol, a 1,2-diol ether or an alkanolamine comprising converting an olefin oxide into the 1,2-diol, the 1,2-diol ether or the alkanolamine wherein the olefin oxide has been prepared by a process for the epoxidation of an olefin in accordance with the present invention.

DETAILED DESCRIPTION OF THE INVENTION

Catalysts prepared in accordance with this invention, using a carrier that has been prepared by depositing boron on the carrier and subsequently calcining the carrier, exhibit an unexpected improvement in performance in olefin epoxidation relative to catalysts, which, while otherwise identical, were prepared using a different carrier. The improved performance achieved as a result of the present invention is apparent from one or more of improved initial activity, improved initial selectivity, improved activity stability, and improved selectivity stability.

The carriers of the present invention are prepared by a process that involves depositing boron on the carrier and subsequently calcining the carrier. Desirably, the calcination is conducted at a temperature of at least about 450° C. The deposition of boron on the carrier and calcination of the carrier are conducted prior to the deposition of silver to form a catalyst. The boron deposited on the carrier in accordance with the present invention is distinct from, and therefore in addition to, any boron, commonly boric acid, that may have been used during the formation of the carrier.

The carriers that may be used in the various embodiments of the present invention are believed to include any of the large number of conventional, porous refractory catalyst carriers or support materials that are considered relatively inert in the presence of olefin oxidation feeds, products, and reaction conditions. Such carriers are commonly inorganic materials, including, but not limited to, alumina, silica, or titania-based compositions, or combinations thereof, such as alumina-silica carriers. Such carriers may also be made from carbon-based materials, including, but not limited to, charcoal, activated carbon, or fullerenes. Other suitable carriers include, but are not limited to, pumice, magnesia, zirconia, silicon carbide, selected clays, artificial and natural zeolites, ceramics, and alkaline earth metal carbonates, for example calcium carbonate or magnesium carbonate. Preferred carriers for use with the present invention comprise the aluminous materials, in particular those comprising alpha alumina.

The carriers that may be used in accordance with this invention are not generally limited. Suitable carriers comprise at least 85 percent by weight, more typically at least 90 percent by weight, in particular at least 95 percent by weight alpha alumina, frequently up to 99.9 percent by weight alpha alumina, based on the weight of the carrier. The carrier may additionally comprise, silica, alkali metal, for example sodium and/or potassium, and/or alkaline earth metal, for example calcium and/or magnesium.

Suitable carriers are also not generally limited with respect to surface area, water absorption, or other properties. The surface area of the carrier may suitably be at least 0.1 m$^2$/g, preferably at least 0.3 m$^2$/g, more preferably at least 0.5 m$^2$/g, and in particular at least 0.6 m$^2$/g, relative to the weight of the carrier; and the surface area may suitably be at most 10 m$^2$/g, preferably at most 5 m$^2$/g, and in particular at most 3 m$^2$/g, relative to the weight of the carrier. "Surface area" as used herein is understood to relate to the surface area as determined by the B.E.T. (Brunauer, Emmett and Teller) method as described in Journal of the American Chemical Society 60 (1938) pp. 309-316. The water absorption of the carrier may suitably be at least 0.2 g/g, preferably at least 0.3 g/g, relative to the weight of the carrier. The water absorption of the carrier may suitably be at most 0.8 g/g, preferably at most 0.7 g/g, relative to the weight of the carrier. As used herein, water absorption is deemed to have been measured in accordance with ASTM C20, and water absorption is expressed as the weight of the water that may be absorbed into the pores of the carrier, relative to the weight of the carrier. The carrier particles may comprise those shapes known in the art, including spheres and cylinders.

In accordance with various embodiments of the present invention, carriers that may be used may be washed in accordance with the teachings of U.S. Pat. No. 6,368,998-B1, U.S. Pat. No. 6,579,825-B2, and U.S. Pat. No. 6,656,874-B2, the entirety of which are hereby incorporated by reference.

Boron deposited on carriers in accordance with the various embodiments of the present invention may be provided in any number of forms. Preferably, sources of boron oxide are employed and provided to the carrier. Such boron oxide sources that may be used in conjunction with the present invention include boric acid ($H_3BO_3$), lithium tetraborate ($Li_2B_4O_7$), lithium metaborate ($LiBO_2$), ammonium tetraborate (($NH_4)_2B_4O_7$), sodium tetraborate ($Na_2B_4O_7$), and combinations thereof. Other suitable sources of boron oxide include, but are not limited to, other tetraborate salts and organoboron compounds, such as borate esters and other organic derivatives of boric acid. Desirably, the boron source is soluble in any impregnating solution used to deposit the boron on the carrier. Desirably, for handling purposes, the boron source exhibits low toxicity and low volatility.

Without being limited to any particular theory, it is currently believed that benefits obtained as a result of the use of boron in accordance with the present invention may be due to the formation of at least localized glassy overlayers containing boron oxide or oxides.

The manner by which the boron is introduced is not generally limited, and those methods known in the art for incorporating various species onto a carrier may be used for the present invention. For example, the boron may be incorporated by conventional impregnation techniques, such as vacuum impregnation.

After the boron is deposited on the carrier, the carrier is calcined, desirably under conditions capable of causing $B_2O_3$ to melt. This is generally observed to occur at temperatures of at least about 450° C. Accordingly, the carrier is preferably calcined at a temperature of at least about 450° C. Desirably, the carrier may be calcined at a temperature of at least about 500° C., desirably at least about 600° C., desirably at least about 700° C., and desirably at most about 750° C. The calcination may be conducted at temperatures lower than 450° C., e.g., temperatures as low as about 250° C.; however, the beneficial effects of boron in such instances may generally be observed to occur only at higher levels of boron. At higher calcinations temperatures, e.g., temperatures approaching and exceeding 750° C., the beneficial effects of boron may be observed to decline. Such observations may be a result of sintering of the boron or some other mechanism whereby the effective concentration of boron is reduced.

The atmosphere in which the calcination is conducted is not generally limited. The calcination can, for example, be conducted in the presence of air or inert gas.

Variations in calcining known in the art, such as holding at one temperature for a certain period of time and then raising the temperature to a second temperature over the course of a second period of time, are contemplated by the present invention. Thus, the carrier may be subjected to drying at one temperature and then calcined at a second, higher temperature In accordance with other embodiments of the present invention, catalysts for the epoxidation of an olefin are prepared using a carrier that has been prepared in accordance with the present invention. In accordance with such embodiments, the catalysts are prepared by a process comprising selecting a carrier; depositing boron on the carrier; subsequently calcining the carrier; and thereafter depositing silver and any other dopants on the calcined carrier containing the deposited boron.

The catalysts of the present invention comprise carriers prepared in accordance with the present invention having deposited thereon a silver component.

In preferred embodiments, amongst others, the catalyst additionally comprises a Group IA metal component. In certain embodiments, amongst others, the catalyst additionally comprises a high-selectivity dopant, preferably a rhenium component. In preferred embodiments, amongst others, the catalyst comprises A rhenium component in combination with one or more rhenium co-promoters.

In certain embodiments, when a carrier prepared in accordance with the present invention is intended for use in preparing an olefin epoxidation catalyst containing a high-selectivity dopant, particularly rhenium, the carrier desirably has at least about 200 ppmw boron, based on the weight of the carrier, deposited thereon. Suitably, the carrier may have at least about 300 ppmw boron, suitably at least about 400 ppmw boron, suitably at least about 500 ppmw boron, and suitably as much as 1000 ppmw boron.

In certain embodiments, when a carrier prepared in accordance with the present invention is intended for use in preparing an olefin epoxidation catalyst that does not contain a high-selectivity dopant, the carrier desirably has at least about 1000 ppmw boron, based on the weight of the carrier, deposited thereon. Suitably, the carrier may have at least 1500 ppmw boron, suitably at least 2000 ppmw boron, suitably at least 3000 ppmw boron, and suitably as much as 5000 ppmw boron.

Olefin epoxidation catalysts prepared in accordance with the present invention comprise silver as a catalytically active component. Appreciable catalytic activity is typically obtained by employing silver in an amount of at least 10 g/kg, calculated as the weight of the element relative to the weight of the catalyst. Preferably, the catalyst comprises silver in a quantity of from 50 to 500 g/kg, more preferably from 100 to 400 g/kg, for example 105 g/kg, or 120 g/kg, or 190 g/kg, or 250 g/kg, or 350 g/kg.

The catalyst may also comprise, and preferably does comprise, a Group IA metal component. The Group IA metal component typically comprises one or more of lithium, potassium, rubidium, and cesium. Preferably, the Group IA metal component is lithium, potassium and/or cesium. Most preferably, the Group IA metal component comprises cesium. Desirably, the Group IA metal component comprises cesium in combination with lithium. Typically, the Group IA metal component is present in the catalyst in a quantity of from 0.01 to 100 mmole/kg, more typically from 0.50 to 50 mmole/kg, more typically from 1 to 20 mmole/kg, calculated as the total quantity of the element relative to the weight of the catalyst. The form in which the Group IA metal is provided to the carrier is not generally limited. For example, the Group IA metal may suitably be provided as a hydroxide or salt.

As used herein, the quantity of Group IA metal present in the catalyst is deemed to be the quantity in so far as it may be extracted from the catalyst with de-ionized water at 100° C. The extraction method involves extracting a 10-gram sample of the catalyst three times by heating it in 20 mL portions of de-ionized water for 5 minutes at 100° C. and determining in the combined extracts the relevant metals by using a known method, for example atomic absorption spectroscopy.

In various embodiments, the catalyst may comprise, in addition to silver, one or more high-selectivity dopants. Catalysts comprising a high-selectivity dopant are known from U.S. Pat. No. 4,761,394 and U.S. Pat. No. 4,766,105, which are incorporated herein by reference. The high-selectivity dopants may comprise, for example, components comprising one or more of rhenium, molybdenum, chromium, and tungsten. The high-selectivity dopants may be present in a total quantity of from 0.01 to 500 mmole/kg, calculated as the element (for example, rhenium, molybdenum, tungsten, and/or chromium) on the total catalyst. Rhenium, molybdenum, chromium, or tungsten may suitably be provided as an oxide or as an oxyanion, for example, as a perrhenate, molybdate, and tungstate, in salt or acid form. The high-selectivity dopants may be employed in the invention in a quantity sufficient to provide a catalyst having a content of high-selectivity dopant as disclosed herein.

Of special preference are catalysts that comprise a rhenium component, and more preferably also a rhenium co-promoter, in addition to silver. Rhenium co-promoters are selected from components comprising tungsten, molybdenum, chromium, sulfur, phosphorus, boron, and combinations thereof.

When the catalyst comprises a rhenium component, rhenium is typically present in a quantity of at least 0.1 mmole/kg, more typically at least 0.5 mmole/kg, and preferably at least 1 mmole/kg, in particular at least 1.5 mmole/kg, calculated as the quantity of the element relative to the weight of the catalyst. Rhenium is typically present in a quantity of at most 500 mmole/kg, preferably at most 50 mmole/kg, and more preferably at most 10 mmole/kg. Again, the form in which rhenium is provided to the carrier is not material to the invention. For example, rhenium may suitably be provided as an oxide or as an oxyanion, for example, as a rhenate or perrhenate, in salt or acid form.

If present, preferred amounts of the rhenium co-promoter are from 0.1 to 30 mmole/kg, based on the total amount of the relevant elements, i.e., tungsten, molybdenum, chromium, sulfur, phosphorus and/or boron, relative to the weight of the catalyst. The form in which the rhenium co-promoter is provided to the carrier is not generally limited. For example, the rhenium co-promoter may suitably be provided as an oxide or as an oxyanion, in salt or acid form.

The preparation of the catalysts, including methods for incorporating silver, Group IA metal, high-selectivity dopant, rhenium component, and rhenium compromoter, is known in the art and the known methods are applicable to the preparation of the catalyst that may be used in accordance with the present invention. Methods of preparing the catalyst include impregnating the carrier with a silver compound and performing a reduction to form metallic silver particles. For further description of such methods, reference may be made, for example, to U.S. Pat. No. 5,380,697, U.S. Pat. No. 5,739,075, EP-A-266015, U.S. Pat. No. 6,368,998-B, WO-00/15333, WO-00/15334 and WO-00/15335, which are incorporated herein by reference.

The reduction of cationic silver to metallic silver may be accomplished during a step in which the catalyst is dried, so that the reduction as such does not require a separate process step. This may be the case if the impregnation solution comprises a reducing agent, for example, an oxalate. Such a drying step is suitably carried out at a temperature of at most 300° C., preferably at most 280° C., more preferably at most 260° C., and suitably at a temperature of at least 200° C., preferably at least 210° C., more preferably at least 220° C., suitably for a period of time of at least 1 minute, preferably at least 2 minutes, and suitably for a period of time of at most 60 minutes, preferably at most 20 minutes, more preferably at most 15 minutes, and more preferably at most 10 minutes.

The process for the epoxidation of an olefin of the present invention comprises the steps of contacting a feed comprising an olefin and oxygen with such a catalyst and producing a product mix comprising an olefin oxide.

Although the present epoxidation process may be carried out in many ways, it is preferred to carry it out as a gas phase process, i.e., a process in which the feed is contacted in the gas phase with the catalyst which is present as a solid material, typically in a fixed bed under epoxidation conditions. Epoxidation conditions are those combinations of conditions, notably temperature and pressure, under which epoxidation will occur. Generally, the process is carried out as a continuous process, such as the typical commercial processes involving fixed-bed, tubular reactors.

The typical commercial reactor has a plurality of elongated tubes typically situated parallel to each other. While the size and number of tubes may vary from reactor to reactor, a typical tube used in a commercial reactor will have a length between 4 and 15 meters and an internal diameter between 1 and 7 centimeters. Suitably, the internal diameter is sufficient to accommodate the catalyst. Frequently, in commercial scale operations, the process of the invention may involve a quantity of catalyst which is at least 10 kg, for example at least 20 kg, frequently in the range of from $10^2$ to $10^7$ kg, more frequently in the range of from $10^3$ to $10^6$ kg.

The olefin used in the present epoxidation process may be any olefin, such as an aromatic olefin, for example styrene, or a di-olefin, whether conjugated or not, for example 1,9-decadiene or 1,3-butadiene. A mixture of olefins may also be used. Typically, the olefin is a mono-olefin, for example 2-butene or isobutene. Preferably, the olefin is a mono-α-olefin, for example 1-butene or propylene. The most preferred olefins are ethylene and propylene, with ethylene being the most preferred.

The olefin concentration in the feed may be selected within a wide range. Typically, the olefin concentration in the feed will be at most 80 mole-%, relative to the total feed. Desirably, the olefin concentration will be in the range of from 0.5 to 70 mole-%, in particular from 1 to 60 mole-%, on the same basis. As used herein, the feed is considered to be the composition that is contacted with the catalyst.

The epoxidation process that can be employed in accordance with various embodiments of the present invention is not generally limited. The present epoxidation process may be air-based or oxygen-based, see "Kirk-Othmer Encyclopedia of Chemical Technology", $3^{rd}$ edition, Volume 9, 1980, pp. 445-447. In the air-based process, air or air enriched with oxygen is employed as the source of the oxidizing agent while in the oxygen-based processes high-purity (typically at least 95 mole-%) oxygen is employed as the source of the oxidizing agent. Presently, most epoxidation plants are oxygen-based and this is a preferred embodiment of the present invention.

The oxygen concentration in the feed may be selected within a wide range. However, in practice, oxygen is generally applied at a concentration that avoids the flammable regime. Typically, the concentration of oxygen applied will be within the range of from 1 to 15 mole-%, more typically from 2 to 12 mole-% of the total feed.

In order to remain outside the flammable regime, the concentration of oxygen in the feed may be lowered as the concentration of the olefin is increased. The actual safe operating ranges depend, along with the feed composition, on the reaction conditions, such as the reaction temperature and the pressure.

A reaction modifier may be present in the feed for increasing the selectivity, i.e., suppressing the undesirable oxidation of olefin or olefin oxide to carbon dioxide and water relative to the desired formation of olefin oxide. Many organic compounds, especially organic halides and organic nitrogen compounds, may be employed as the reaction modifier. Nitrogen oxides, organic nitro compounds such as nitromethane, nitroethane, nitropropane and such, hydrazine, hydroxylamine or ammonia may be employed as well. It is frequently considered that under the operating conditions of olefin epoxidation the nitrogen containing reaction modifiers are precursors of nitrates and nitrites, i.e., they are so-called nitrate- or nitrite-forming compounds (c.f. EP-A-3642 and U.S. Pat. No. 4,822,900, which are incorporated herein by reference).

Organic halides are the preferred reaction modifiers, in particular organic bromides and more in particular organic chlorides. Preferred organic halides are chlorohydrocarbons or bromohydrocarbons and are more preferably selected from the group of methyl chloride, ethyl chloride, ethylene dichloride, ethylene dibromide, vinyl chloride, or a mixture thereof. The most preferred organic halides are ethyl chloride, ethylene dichloride, and vinyl chloride.

Suitable nitrogen oxides are of the general formula $NO_x$ wherein x is in the range of from 1 to 2, and include for example NO, $N_2O_3$, and $N_2O_4$. Suitable organic nitrogen compounds are nitro compounds, nitroso compounds, amines, nitrates and nitrites, for example nitromethane, 1-nitropropane or 2-nitropropane. In preferred embodiments, nitrate- or nitrite-forming compounds are used together with an organic halide, in particular, an organic chloride.

The reaction modifiers are generally effective when used in low concentration in the feed, for example, up to 0.1 mole-%, relative to the total feed, for example, from $0.01 \times 10^{-4}$ to 0.01 mole-%. In particular when the olefin is ethylene, it is preferred that the reaction modifier is present in the feed at a concentration of from $0.1 \times 10^{-4}$ to $500 \times 10^{-4}$ mole-%, in particular from $0.2 \times 10^{-4}$ to $200 \times 10^{-4}$ mole-%, relative to the total feed.

In addition to the olefin, oxygen and the reaction modifier, the feed may contain one or more optional components, such as carbon dioxide, inert gases and saturated hydrocarbons. Carbon dioxide is a by-product in the epoxidation process. However, carbon dioxide generally has an adverse effect on the catalyst activity. Typically, a concentration of carbon dioxide in the feed in excess of 25 mole-%, preferably in excess of 10 mole-%, relative to the total feed, is avoided. A concentration of carbon dioxide of less than 2 mole-%, preferably less than 1 mole-%, more preferably in the range of from 0.3 to 0.75 mole-%, relative to the total feed, may be employed. Under commercial operations, a concentration of carbon dioxide of at least 0.01 mole-%, or at least 0.05 mole-%, relative to the total feed, may be present in the feed. Inert gases, for example nitrogen or argon, may be present in the feed in a concentration of from 30 to 90 mole %, typically from 40 to 80 mole-%. Suitable saturated hydrocarbons are methane and ethane. If saturated hydrocarbons are present, they may be present in a quantity of up to 80 mole-%, relative to the total feed, in particular up to 75 mole-%. Frequently they are present in a quantity of at least 30 mole-%, more frequently at least 40 mole-%. Saturated hydrocarbons may be added to the feed in order to increase the oxygen flammability limit.

The epoxidation process may be carried out using epoxidation conditions, including temperature and pressure, selected from a wide range. Frequently, the reaction temperature is in the range of from 150 to 340° C., more frequently in the range of from 180 to 325° C. The reaction temperature may be increased gradually or in a plurality of steps, for example in steps of from 0.1 to 20° C., in particular 0.2 to 10° C., more in particular 0.5 to 5° C. The total increase in the reaction temperature may be in the range of from 10 to 140°

C., more typically from 20 to 100° C. The reaction temperature may be increased typically from a level in the range of from 150 to 300° C., more typically from 200 to 280° C., when a fresh catalyst is used, to a level in the range of from 230 to 340° C., more typically from 240 to 325° C., when the catalyst has decreased in activity due to aging.

The epoxidation process is typically carried out at a reactor inlet pressure in the range of from 1000 to 3500 kPa. "GHSV" or Gas Hourly Space Velocity is the unit volume of gas at normal temperature and pressure (0 C, 1 atm, i.e. 101.3 kPa) passing over one unit volume of packed catalyst per hour. Frequently, when the epoxidation process is a gas phase process involving a fixed catalyst bed, the GHSV is in the range of from 1500 to 10000 Nl/(l.h).

The olefin oxide produced may be recovered from the product mix by using methods known in the art, for example by absorbing the olefin oxide from a product mix in water and optionally recovering the olefin oxide from the aqueous solution by distillation. At least a portion of the aqueous solution containing the olefin oxide may be applied in a subsequent process for converting the olefin oxide into a 1,2-diol, a 1,2-diol ether, or an alkanolamine. The methods employed for such conversions are not limited, and those methods known in the art may be employed.

The conversion into the 1,2-diol or the 1,2-diol ether may comprise, for example, reacting the olefin oxide with water, suitably using an acidic or a basic catalyst. For example, for making predominantly the 1,2-diol and less 1,2-diol ether, the olefin oxide may be reacted with a ten fold molar excess of water, in a liquid phase reaction in presence of an acid catalyst, e.g., 0.5-1.0% w sulfuric acid, based on the total reaction mixture, at 50-70° C. at 1 bar absolute, or in a gas phase reaction at 130-240° C. and 20-40 bar absolute, preferably in the absence of a catalyst. If the proportion of water is lowered, the proportion of 1,2-diol ethers is increased. The 1,2-diol ethers thus produced may be a di-ether, tri-ether, tetra-ether or a subsequent ether. Alternatively, 1,2-diol ethers may be prepared by converting the olefin oxide with an alcohol, in particular a primary alcohol, such as methanol or ethanol, by replacing at least a portion of the water by the alcohol.

The conversion into the alkanolamine may comprise reacting the olefin oxide with an amine, such as ammonia, an alkyl amine, or a dialkylamine. Anhydrous or aqueous ammonia may be used. Anhydrous ammonia is typically used to favor the production of monoalkanolamine. For methods applicable in the conversion of the olefin oxide into the alkanolamine, reference may be made to, for example U.S. Pat. No. 4,845,296, which is incorporated herein by reference.

The 1,2-diol and the 1,2-diol ether may be used in a large variety of industrial applications, for example in the fields of food, beverages, tobacco, cosmetics, thermoplastic polymers, curable resin systems, detergents, heat transfer systems, etc. The alkanolamine may be used, for example, in the treating ("sweetening") of natural gas.

Unless specified otherwise, the organic compounds mentioned herein, for example the olefins, 1,2-diols, 1,2-diol ethers, alkanolamines, and organic halides, have typically at most 40 carbon atoms, more typically at most 20 carbon atoms, in particular at most 10 carbon atoms, more in particular at most 6 carbon atoms. As defined herein, ranges for numbers of carbon atoms (i.e., carbon number) include the numbers specified for the limits of the ranges.

Having generally described the invention, a further understanding may be obtained by reference to the following examples, which are provided for purposes of illustration only and are not intended to be limiting unless otherwise specified.

EXAMPLES

Concentrations for cesium and boron reflected in the Examples that follow are calculated target amounts based on solution concentrations and carrier pore volumes.

Stock Silver Impregnating Solution:

The preparation of a stock silver impregnation solution used for impregnating various support materials in the following examples is described.

In a 5-liter stainless steel beaker, 415 grams of reagent grade sodium hydroxide was dissolved in 2340 ml of deionized water. The temperature of the solution was adjusted to about 50° C. In a 4-liter stainless steel beaker 1699 grams of silver nitrate was dissolved in 2100 ml of deionized water. The temperature of the solution was adjusted to about 50° C. The sodium hydroxide solution was slowly added to the silver nitrate solution with stirring while the temperature was maintained at about 50° C. The resulting slurry was stirred for about 15 minutes. The pH of the solution was maintained at above 10 by the addition of NaOH solution as required. A washing procedure was used which included removing liquid by the use of a filter wand followed by the replacement of the removed liquid with an equivalent volume of deionized water. This washing procedure was repeated until the conductivity of the filtrate dropped below 90 micro-mho/cm. After the completion of the last wash cycle, 1500 ml of deionized water was added, followed by the addition of 630 grams of oxalic acid dihydrate (4.997 moles) in increments of 100 grams while stirring and maintaining the solution at about 40° C. (±5° C.). The pH of the solution was monitored during the addition of the last 130 grams of oxalic acid dihydrate to ensure that it did not drop below 7.8 for an extended period of time. Water was removed from the solution with a filter wand and the slurry was cooled to less than 30° C. Slowly added to the solution was 732 grams of 92% ethylenediamine (EDA). The temperature was maintained below 30° C. during this addition. A spatula was used to manually stir the mixture until enough liquid was present to mechanically stir. The final solution was used as a stock silver impregnation solution for preparing the catalysts in the following examples.

TABLE I

Properties of Carrier Supports

| Properties | Carrier A | Carrier B | Carrier C | Carrier D |
|---|---|---|---|---|
| Water Absorption (%) | 40.7 | 38.0 | 39.7 | 39.7 |
| Packing Density (lbs/ft$^3$) | 49.9 | 50.9 | 48.7 | 47.1 |
| [kg/m$^3$] | [799.3] | [815.3] | [780.1] | [754.5] |
| Surface Area (m$^2$/g) | 0.79 | 0.77 | 0.84 | 0.91 |

Catalyst Preparations

Example 1

A sample of 280 grams of Carrier A was pore volume impregnated with a solution of 0.3224 grams of $H_3BO_3$ (boric acid) dissolved into 114.0 grams of deionized water and equilibrated for 30 minutes. The impregnated carrier was then dried in a nitrogen purged oven at 120° C. for 72 hours, followed by calcining at 600° C. for 3 hours. 140 grams of this material was then boiled in 420 grams of 0.5 wt % ethylenediamine/water solution for 1 minute in a stainless steel beaker. The solution was decanted off, and the treated carrier was dried in air flowing at 16.2 Nl/h at 120° C. for 15 minutes to give a carrier ready for silver catalyst preparation. The dried carrier had a nominal boron loading, calculated on the basis of pore volume impregnation, of 202 ppmw.

Example 2

A silver containing impregnating solution was made by mixing 182.5 grams of silver stock solution of specific gravity 1.565 g/ml with a solution of 0.1675 g of ammonium perrhenate in 2 g of 1:1 (w/w) ethylenediamine/water, 0.0779 g of ammonium metatungstate dissolved in 2 g of 1:1 (w/w) ammonia/water and 0.4306 g lithium nitrate dissolved in water. Additional water was added to adjust the specific gravity of the solution to 1.448 g/ml. To 70 grams of such doped solution was added 0.1960 g of 45.37 weight percent cesium hydroxide solution. This impregnating solution was used to prepare the silver catalyst. A vessel containing 30 grams of the carrier prepared according to Example 1 was evacuated to 20 mm Hg for 1 minute and the final impregnation solution was added while under vacuum, then the vacuum was released and the precursor was allowed to contact the liquid for 3 minutes. The impregnated precursor was then centrifuged at 500 rpm for 2 minutes to remove excess liquid. The wet precursor pellets were placed in a vibrating shaker and dried in air flowing at a rate of 16.2 Nl/h at 250° C. for 5.5 minutes. The final Catalyst composition, calculated on the basis of pore volume impregnation, was 13.2% Ag, 650 ppmw Cs, 175 ppmw B, 1.5 µmole Re/g catalyst, 0.75 µmole W/g catalyst, and 15 µmole Li/g catalyst. These values are relative to the weight of the catalyst.

Example 3

A silver containing impregnating solution was made by mixing 193.4 grams of silver stock solution of specific gravity 1.565 g/ml with a solution of 0.1650 g of ammonium perrhenate in 2 g of 1:1 (w/w) ethylenediamine/water, 0.0767 g of ammonium metatungstate dissolved in 2 g of 1:1 (w/w) ammonia/water and 0.4240 g lithium nitrate dissolved in water. Additional water was added to adjust the specific gravity of the solution to 1.488 g/ml. To 70 grams of such doped solution was mixed added 0.2079 g of 45.37 weight percent cesium hydroxide solution. This impregnating solution was used to prepare the silver catalyst. A vessel containing 30 grams of the carrier prepared according to Example 1 was evacuated to 20 mm Hg for 1 minute and the final impregnation solution was added while under vacuum, then the vacuum was released and the precursor allowed to contact the liquid for 3 minutes. The impregnated precursor was then centrifuged at 500 rpm for 2 minutes to remove excess liquid. The wet precursor pellets were placed in a vibrating shaker and dried in air flowing at a rate of 16.2 Nl/h at 250° C. for 5.5 minutes. The final Catalyst composition, calculated on the basis of pore volume impregnation, was 14.2% Ag, 700 ppm Cs, 175 ppmw B, 1.5 µmole Re/g catalyst, 0.75 µmole W/g catalyst, and 15 µmole Li/g catalyst. These values are relative to the weight of the catalyst.

Example 4A

A sample of 600 grams of Carrier B was pore volume impregnated with a solution of 1.382 grams of $H_3BO_3$ (boric acid) dissolved into 228.0 grams of deionized water and equilibrated for 30 minutes, with frequent agitation. The impregnated carrier was then dried in a nitrogen purged oven at 120° C. for 72 hours, followed by calcining at 600° C. for 3 hours. 105 grams of this material was then boiled in 315 grams of 1.0 wt % ethylenediamine/water solution for 1 minute in a stainless steel beaker. The solution was decanted off, and the wet carrier was immersed in 315 grams of room temperature deionized water for 30 seconds. The wet carrier was then dried for 18 hours in air at 120° C. to give a carrier ready for silver catalyst preparation. The dried carrier had a nominal boron loading, calculated on the basis of pore volume impregnation, of 402 ppmw.

Example 4B

A sample of 600 grams of Carrier B was pore volume impregnated with a solution of 0.6912 grams of $H_3BO_3$ (boric acid) dissolved into 228.0 grams of deionized water and equilibrated for 30 minutes, with frequent agitation. The impregnated carrier was then dried in a nitrogen purged oven at 120° C. for 72 hours, followed by calcining at 600° C. for 3 hours. The dried carrier had a nominal boron loading, calculated on the basis of pore volume impregnation, of 201 ppmw.

Example 5

A silver containing impregnating solution was made by mixing 170.3 grams of silver stock solution of specific gravity 1.535 g/ml with a solution of 0.1509 g of ammonium perrhenate in 2 g of 1:1 (w/w) ethylenediamine/water, 0.0467 g of ammonium metatungstate dissolved in 2 g of 1:1 (w/w) ammonia/water and 0.3877 g lithium nitrate dissolved in water. Additional water was added to adjust the specific gravity of the solution to 1.480 g/ml. 60 grams of such doped solution was mixed with 0.1707 g of 45.37 weight percent cesium hydroxide solution. This impregnating solution was used to prepare the silver catalyst. A vessel containing 30 grams of the carrier prepared according to Example 4A was evacuated to 20 mm Hg for 1 minute and the final impregnation solution was added while under vacuum, then the vacuum was released and the precursor allowed to contact the liquid for 3 minutes. The impregnated precursor was then centrifuged at 500 rpm for 2 minutes to remove excess liquid. The wet precursor pellets were placed in a vibrating shaker and dried in air flowing at a rate of 16.2 Nl/h at 250° C. for 5.5 minutes. The final Catalyst composition, calculated on the basis of pore volume impregnation, was 13.2% Ag, 630 ppm Cs, 351 ppmw B, 1.5 µmole Re/g catalyst, 0.50 µmole W/g catalyst, and 15 µmole Li/g catalyst. These values are relative to the weight of the catalyst.

Example 6

A silver containing impregnating solution was made by mixing 170.3 grams of silver stock solution of specific gravity 1.535 g/ml with a solution of 0.1509 g of ammonium perrhenate in 2 g of 1:1 (w/w) ethylenediamine/water, 0.0701 g of ammonium metatungstate dissolved in 2 g of 1:1 (w/w) ammonia/water and 0.3877 g lithium nitrate dissolved in water. Additional water was added to adjust the specific gravity of the solution to 1.480 g/ml. 60 grams of such doped solution was mixed with 0.1707 g of 45.37 weight percent cesium hydroxide solution. This impregnating solution was used to prepare the silver catalyst. A vessel containing 30 grams of the carrier prepared according to Example 4B was evacuated to 20 mm Hg for 1 minute and the final impregnation solution was added while under vacuum, then the vacuum was released and the precursor allowed to contact the liquid for 3 minutes. The impregnated precursor was then centrifuged at 500 rpm for 2 minutes to remove excess liquid.

The wet precursor pellets were placed in a vibrating shaker and dried in air flowing at a rate of 16.2 Nl/h at 250° C. for 5.5 minutes. The final Catalyst composition, calculated on the basis of pore volume impregnation, was 13.2% Ag, 630 ppm Cs, 175 ppmw B, 1.5 μmole Re/g catalyst, 0.75 μmole W/g catalyst, and 15 μmole Li/g catalyst. These values are relative to the weight of the catalyst.

Example 7

A sample of 335 grams of Carrier C was pore volume impregnated with a solution of 0.3859 grams of $H_3BO_3$ (boric acid) dissolved into 135.0 grams of deionized water and equilibrated for 30 minutes. The impregnated carrier was then dried in a nitrogen purged oven at 120° C. for 18 hours, followed by calcining at 600° C. for 3 hours. After cooling, the boron impregnated material was then boiled in 1005 grams of 0.5 wt % ethylenediamine/water solution for 1 minute in a stainless steel beaker. The solution was decanted off, and the treated carrier was dried in air flowing at 16.2 Ni/h at 120° C. for 30 minutes to give a carrier ready for silver catalyst preparation. The dried carrier had a nominal boron loading, calculated on the basis of pore volume impregnation, of 201 ppmw.

Example 8

A silver containing impregnating solution was made by mixing 247.6 grams of silver stock solution of specific gravity 1.565 g/ml with a solution of 0.2272 g of ammonium perrhenate in 2 g of 1:1 (w/w) ethylenediamine/water, 0.1056 g of ammonium metatungstate dissolved in 2 g of 1:1 (w/w) ammonia/water and 0.5840 g lithium nitrate dissolved in water. Additional water was added to adjust the specific gravity of the solution to 1.459 g/ml. To 70 grams of such doped solution was added 0.1994 g of 45.37 weight percent cesium hydroxide solution. This impregnating solution was used to prepare the silver catalyst. A vessel containing 30 grams of the carrier prepared according to Example 7 was evacuated to 20 mm Hg for 1 minute and the final impregnation solution was added while under vacuum, then the vacuum was released and the precursor allowed to contact the liquid for 3 minutes. The impregnated precursor was then centrifuged at 500 rpm for 2 minutes to remove excess liquid. The wet precursor pellets were placed in a vibrating shaker and dried in air flowing at a rate of 16.2 Nl/h at 250° C. for 5.5 minutes. The final Catalyst composition, calculated on the basis of pore volume impregnation, was 13.2% Ag, 650 ppm Cs, 175 ppmw B, 1.5 μmole Re/g catalyst, 0.75 μmole W/g catalyst, and 15 μmole Li/g catalyst. These values are relative to the weight of the catalyst.

Example 9

Comparative Example

A sample of 600 grams of Carrier C was boiled in 1800 grams of 1.0 wt % ethylenediamine/water solution for 2 minute in a stainless steel beaker. The solution was decanted off, and 300 grams of the wet carrier was immersed into 900 grams of room temperature deionized water for 3-5 seconds. This immersion was repeated two more times, using fresh deionized water for each immersion. The wet carrier was then dried for 18 hours in nitrogen at 120° C., followed by 600° C. for 5 minutes to give a carrier ready for silver catalyst preparation.

Example 10

Comparative Example

A silver containing impregnating solution was made by mixing 220.3 grams of silver stock solution of specific gravity 1.535 g/ml with a solution of 0.1952 g of ammonium perrhenate in 2 g of 1:1 (w/w) ethylenediamine/water, 0.0907 g of ammonium metatungstate dissolved in 2 g of 1:1 (w/w) ammonia/water and 0.5018 g lithium nitrate dissolved in water. Additional water was added to adjust the specific gravity of the solution to 1.459 g/ml. 60 grams of such doped solution was mixed with 0.1657 g of 45.37 weight percent cesium hydroxide solution. This impregnating solution was used to prepare the silver catalyst. A vessel containing 30 grams of the carrier prepared according to Example 9 was evacuated to 20 mm Hg for 1 minute and the final impregnation solution was added while under vacuum, then the vacuum was released and the precursor allowed to contact the liquid for 3 minutes. The impregnated precursor was then centrifuged at 500 rpm for 2 minutes to remove excess liquid. The wet precursor pellets were placed in a vibrating shaker and dried in air flowing at a rate of 16.2 Nl/h at 250° C. for 5.5 minutes. The final Catalyst composition, calculated on the basis of pore volume impregnation, was 13.2% Ag, 630 ppm Cs, 1.5 μmole Re/g catalyst, 0.75 μmole W/g catalyst, and 15 μmole Li/g catalyst. These values are relative to the weight of the catalyst.

Example 11

A sample of 500 grams of Carrier D was pore volume impregnated with a solution of 2.860 grams of $H_3BO_3$ (boric acid) dissolved into 194.7 grams of deionized water and equilibrated for 30 minutes. The impregnated carrier was then dried in an air purged oven at 120° C. for 72 hours. The dried carrier was then divided into three portions and each was calcined in air for 3 hours at three different temperatures. Sample 11a was calcined at 250° C., Sample 11b calcined at 500° C., and Sample 11c calcined at 750° C. The nominal boron loading for these carriers, calculated on the basis of pore volume impregnation, was 1000 ppmw B.

Example 12

A silver catalyst was prepared on the carrier from Example 11a according to the following procedure. A silver containing impregnating solution was made by mixing 33.3 grams of silver stock solution of specific gravity 1.552 g/ml with a solution of 0.1055 g 45.26 wt % cesium hydroxide in 1 cc water. Additional water was added to adjust the specific gravity of the solution to 1.512 g/ml. This impregnating solution was used to prepare the silver catalyst. A vessel containing 30 grams of the carrier prepared according to Example 11a was evacuated to 20 mm Hg for 1 minute and the final impregnation solution was added while under vacuum, then the vacuum was released and the precursor allowed to contact the liquid for 3 minutes. The impregnated precursor was then centrifuged at 500 rpm for 2 minutes to remove excess liquid. The wet precursor pellets were placed in a vibrating shaker and dried in air flowing at a rate of 16.2 Nl/h at 240° C. for 4 minutes. The final catalyst composition, calculated on the basis of pore volume impregnation, was 14.5 wt % Ag, 700 ppmw Cs, and 855 ppmw B. These values are relative to the weight of the catalyst.

Example 13

A silver catalyst was prepared on the carrier from Example 11b according to the procedure in Example 12. The final catalyst composition, calculated on the basis of pore volume impregnation, was 14.5 wt % Ag, 700 ppmw Cs, and 855 ppmw B. These values are relative to the weight of the catalyst.

Example 14

A silver catalyst was prepared on the carrier from Example 11c according to the procedure in Example 12. The final catalyst composition, calculated on the basis of pore volume impregnation, was 14.5 wt % Ag, 700 ppmw Cs, and 855 ppmw B. These values are relative to the weight of the catalyst.

Example 15

The impregnation and drying procedure in Example 11 was repeated using 5.721 grams of $H_3BO_3$, resulting in twice the boric acid loading on Carrier D. This carrier was calcined in air at 750° C. for 3 hours. The nominal boron loading for this carrier, calculated on the basis of pore volume impregnation, was 2000 ppmw B.

Example 16

A silver catalyst was prepared on the carrier from Example 15 according to the procedure in Example 12. The final catalyst composition, calculated on the basis of pore volume impregnation, was 14.5 wt % Ag, 700 ppmw Cs, and 1710 ppmw B. These values are relative to the weight of the catalyst.

Example 17

Comparative

A silver containing impregnating solution was made by mixing 182.5 grams of silver stock solution of specific gravity 1.565 g/ml with a solution of 0.1675 g of ammonium perrhenate in 2 g of 1:1 (w/w) ethylenediamine/water, 0.0779 g of ammonium metatungstate dissolved in 2 g of 1:1 (w/w) ammonia/water and 0.4306 g lithium nitrate dissolved in water. Additional water was added to adjust the specific gravity of the solution to 1.448 g/ml. To 60 grams of such doped solution was added 0.1357 g of 45.37 weight percent cesium hydroxide solution. This impregnating solution was used to prepare the silver catalyst. A vessel containing 30 grams of Carrier A was evacuated to 20 mm Hg for 1 minute and the final impregnation solution was added while under vacuum, then the vacuum was released and the precursor allowed to contact the liquid for 3 minutes. The impregnated precursor was then centrifuged at 500 rpm for 2 minutes to remove excess liquid. The wet precursor pellets were placed in a vibrating shaker and dried in air flowing at a rate of 16.2 Nl/h at 250° C. for 5.5 minutes. The final Catalyst composition, calculated on the basis of pore volume impregnation, was 13.2% Ag, 450 ppm Cs, 1.5 µmole Re/g catalyst, 0.75 µmole W/g catalyst, and 15 µmole Li/g catalyst. These values are relative to the weight of the catalyst.

Example 18

Comparative

A silver catalyst was prepared on Carrier D according to the following procedure. A silver containing impregnating solution was made by mixing 51.0 grams of silver stock solution of specific gravity 1.553 g/ml with a solution of 0.0969 g 45.26 wt % cesium hydroxide in 1 cc water. Additional water was added to adjust the specific gravity of the solution to 1.512 g/ml. This impregnating solution was used to prepare the silver catalyst. A vessel containing 30 grams of Carrier D was evacuated to 20 mm Hg for 1 minute and the final impregnation solution was added while under vacuum, then the vacuum was released and the precursor allowed to contact the liquid for 3 minutes. The impregnated precursor was then centrifuged at 500 rpm for 2 minutes to remove excess liquid. The wet precursor pellets were placed in a vibrating shaker and dried in air flowing at a rate of 16.2 Nl/h at 240° C. for 4 minutes. The final catalyst composition, calculated on the basis of pore volume impregnation, was 14.5 wt % Ag, 450 ppmw Cs. These values are relative to the weight of the catalyst.

Example 19

A sample of 500 grams of Carrier D was pore volume impregnated with a solution of 0.286 grams of $H_3BO_3$ (boric acid) dissolved into 194.7 grams of deionized water and equilibrated for 30 minutes. The impregnated carrier was then dried in an air purged oven at 120° C. for 72 hours. The dried carrier was then calcined in air for 1 hour at 500° C., giving a carrier containing a nominal boron loading, calculated on the basis of pore volume impregnation, of 100 ppmw B.

Example 20

Comparative

A silver catalyst was prepared on the carrier from Example 19 according to the following procedure. A silver containing impregnating solution was made by mixing 51.0 grams of silver stock solution of specific gravity 1.553 g/ml with a solution of 0.1076 g 45.26 wt % cesium hydroxide in 1 cc water. Additional water was added to adjust the specific gravity of the solution to 1.512 g/ml. This impregnating solution was used to prepare the silver catalyst. A vessel containing 30 grams of the carrier from Example 19 was evacuated to 20 mm Hg for 1 minute and the final impregnation solution was added while under vacuum, then the vacuum was released and the precursor allowed to contact the liquid for 3 minutes. The impregnated precursor was then centrifuged at 500 rpm for 2 minutes to remove excess liquid. The wet precursor pellets were placed in a vibrating shaker and dried in air flowing at a rate of 16.2 Nl/h at 240° C. for 4 minutes. The final catalyst composition, calculated on the basis of pore volume impregnation, was 14.5 wt % Ag, 500 ppmw Cs, and 85 ppmw B. These values are relative to the weight of the catalyst.

Example 21

A sample of 500 grams of Carrier C was washed according to the procedure in U.S. Pat. No. 6,656,874-B2, Column 6, lines 27-35.

Example 22

A sample of 500 grams of the washed and dried carrier from Example 21 was pore volume impregnated with a solution of 2.860 grams of $H_3BO_3$ (boric acid) dissolved into 194.7 grams of deionized water and equilibrated for 30 minutes. The impregnated carrier was then dried in an air purged oven at 120° C. for 72 hours. The dried carrier was then calcined in air for 3 hours at 500° C. The nominal boron loading, calculated on the basis of pore volume impregnation, was 1000 ppmw B.

Example 23

A silver catalyst was prepared on the carrier from Example 22 according to the procedure in U.S. Pat. No. 6,656,874-B2, Example 7. The final catalyst composition, calculated on the basis of pore volume impregnation, was 14.5 wt % Ag, 500 ppmw Cs, 278 ppmw Li, and 855 ppmw B. These values are relative to the weight of the catalyst.

Example 24

Comparative

A silver catalyst was prepared on a carrier, prepared according to Example 21, according to the procedure in U.S. Pat. No. 6,656,874-B2, Example 7. The final catalyst composition, calculated on the basis of pore volume impregnation, was 14.5 wt % Ag, 450 ppmw Cs, and 278 ppmw Li. These values are relative to the weight of the catalyst.

The cesium amounts of the above catalysts are the optimized cesium amounts with respect to the initial selectivity performance of the catalysts.

Catalyst Testing

The catalysts were used to produce ethylene oxide from ethylene and oxygen. To do this, crushed catalyst were loaded into stainless steel U-shaped tubes. Each tube was immersed in a molten metal bath (heat medium) and the ends were connected to a gas flow system.

Catalysts prepared according to Examples 2, 3, 5, 6, 8, 10, and 17 were tested at Condition A. Catalysts prepared according to Examples 12, 13, 14, 16, 18, and 20 were tested at Condition B. Catalysts prepared according to Examples 23 and 24 were tested at Condition C.

Testing Condition A

The weight of catalyst used and the inlet gas flow rate (0.28 Nl/minute) were adjusted to give a gas hourly space velocity of 3300 Nl/(l·h), as calculated for uncrushed catalyst. The inlet gas pressure was 1550 kPa (absolute).

The gas mixture passed through the catalyst bed, in a "once-through" operation, during the entire test run including the start-up, consisted of 30.0 volume percent ethylene, 8.0 volume percent oxygen, 2.0 volume percent carbon dioxide, 60 volume percent nitrogen and 1.0 to 6.0 parts per million by volume (ppmv) ethyl chloride.

The initial reactor temperature was 180° C., and this was ramped up at a rate of 10° C. per hour to 225° C. and then adjusted so as to achieve a constant ethylene oxide content of 3.1 volume percent in the outlet gas stream. Ethyl chloride concentration was adjusted to give optimum performance. Performance data at condition are normally obtained within 3 days. These data are tabulated for selected catalysts in Table II.

Testing Condition B

The weight of catalyst used and the inlet gas flow rate (0.50 Nl/minute) were adjusted to give a gas hourly space velocity of 30,000 Nl/(l·h), as calculated for uncrushed catalyst. The inlet gas pressure was 1550 kPa (absolute).

The gas mixture passed through the catalyst bed, in a "once-through" operation, during the entire test run including the start-up, consisted of 30.0 volume percent ethylene, 8.0 volume percent oxygen, 5.0 volume percent carbon dioxide, 57.0 volume percent nitrogen and 5.6 parts per million by volume (ppmv) ethyl chloride.

The initial reactor temperature was 180° C., and this was ramped up at a rate of 10° C. per hour to 225° C. and then adjusted so as to achieve a constant oxygen conversion level of 25.0 percent during the course of the run. Performance loss over time for selected catalysts is tabulated in Table III.

Testing Condition C

The weight of catalyst used and the inlet gas flow rate (0.28 Nl/minute) were adjusted to give a gas hourly space velocity of 6800 Nl/(l·h), as calculated for uncrushed catalyst. The inlet gas pressure was 1550 kPa (absolute).

The gas mixture passed through the catalyst bed, in a "once-through" operation, during the entire test run including the start-up, consisted of 25.0 volume percent ethylene, 7.0 volume percent oxygen, 5.0 volume percent carbon dioxide, 63 volume percent nitrogen and 2.5 parts per million by volume (ppmv) ethyl chloride.

The initial reactor temperature was 180° C., and this was ramped up at a rate of 10° C. per hour to 225° C. and then adjusted so as to achieve a constant ethylene oxide content of 1.5 volume percent in the outlet gas stream. Ethyl chloride concentration was adjusted to give optimum performance. Performance data at this condition are reported after 21 days of testing. These data are tabulated for selected catalysts in Table IV.

TABLE II

Initial performance of Rhenium catalysts prepared on Boron pre-doped carriers. Data acquired under Testing Condition A.

| Sample | Boron on Carrier (ppmw) | Carrier | Boron on Catalyst (ppmw) | Cesium on Catalyst (ppmw) | Sel (%) | Temp (° C.) |
|---|---|---|---|---|---|---|
| Example 17 (comparative) | 0 | A | 0 | 450 | 88.4 | 255 |
| Example 2 | 202 | A | 175 | 650 | 89.0 | 251 |
| Example 3 | 202 | A | 175 | 700 | 89.0 | 245 |
| Example 5 | 402 | B | 351 | 630 | 87.1 | 246 |
| Example 6 | 201 | B | 175 | 630 | 89.0 | 244 |
| Example 8 | 201 | C | 175 | 650 | 88.7 | 246 |
| Example 10 (comparative) | 0 | C | 0 | 630 | 88.0 | 257 |

TABLE III

Relative selectivity change for selected catalysts prepared from boron pre-loaded carriers. Data acquired under Testing Condition B.

| Sample | Boron on Carrier (ppmw) | Calcine Temp (° C.) | Sel. (%) change 100 hrs | Sel. (%) change 200 hrs | Sel. (%) change 300 hrs | Hours for 1.0% Sel. Loss |
|---|---|---|---|---|---|---|
| Example 18 (comparative) | 0.0 | — | −0.2 | −0.6 | −1.0 | 300 |
| Example 20 (comparative) | 100 | 500 | −0.2 | −0.6 | −1.0 | 300 |
| Example 12 | 1000 | 250 | −0.2 | −0.3 | −0.5 | 570 |
| Example 13 | 1000 | 500 | −0.1 | −0.2 | −0.3 | 930 |
| Example 14 | 1000 | 750 | −0.2 | −0.5 | −0.7 | 410 |
| Example 16 | 2000 | 750 | −0.1 | −0.3 | −0.4 | 670 |

TABLE IV

Initial performance of a catalyst prepared on Boron pre-doped carrier. Data acquired under Testing Condition C.

| Sample | Boron on Carrier (ppmw) | Boron on Catalyst (ppmw) | Cesium on Catalyst (ppmw) | Sel (%) | Temp (° C.) |
|---|---|---|---|---|---|
| Example 24 (comparative) | 0 | 0 | 450 | 82.7 | 227 |
| Example 23 | 1000 | 855 | 500 | 83.5 | 228 |

Catalysts prepared according to the invention exhibit improved performance characteristics with respect to one or more of initial activity, initial selectivity, activity stability, and selectivity stability. It is considered that these improvements in performance are the result of improved silver dispersion on fresh catalyst and better maintenance of silver dispersion during catalyst operation, relative to an identical catalyst formulation without the benefit of the boron pre-doped carrier.

What is claimed is:

1. A process for the preparation of a catalyst comprising: depositing boron on a carrier in a quantity of at least 200 ppmw, based on the weight of the carrier; subsequently calcining the carrier; and depositing silver and a high-selectivity dopant on the calcined carrier.

2. The process as claimed in claim 1 wherein the high-selectivity dopant comprises a rhenium component.

3. The process as claimed in claim 2, wherein the process further comprises depositing a rhenium co-promoter on the calcined carrier.

4. The process as claimed in claim 1, wherein the process further comprises depositing a Group IA metal component on the calcined carrier.

5. The process as claimed in claim 1, wherein the carrier is calcined at a temperature of at least 500° C.

6. The process as claimed in claim 1, wherein the carrier is calcined at a temperature of at least 600° C.

7. The process as claimed in claim 1, wherein the carrier is calcined at a temperature of at most 750° C.

8. The process as claimed in claim 1, wherein the carrier comprises alpha-alumina.

9. The process as claimed in claim 1, wherein the boron is provided to the carrier as at least one species selected from the group consisting of boric acid, lithium tetraborate, lithium metaborate, ammonium tetraborate, sodium tetraborate, and combinations thereof.

10. The process as claimed in claim 1, wherein the boron is provided to the carrier as at least one species comprising boric acid.

11. A process for the preparation of a catalyst comprising: depositing boron on a carrier in a quantity of at least 1000 ppmw, based on the weight of the carrier; subsequently calcining the carrier; and depositing silver on the calcined carrier.

12. The process as claimed in claim 11, wherein the process further comprises depositing a Group IA metal component on the calcined carrier.

13. The process as claimed in claim 11, wherein the carrier is calcined at a temperature of at least 500° C.

14. The process as claimed in claim 11, wherein the carrier is calcined at a temperature of at most 750° C.

15. The process as claimed in claim 11, wherein the carrier comprises alpha-alumina.

16. The process as claimed in claim 11, wherein the boron is provided to the carrier as at least one species selected from the group consisting of boric acid, lithium tetraborate, lithium metaborate, ammonium tetraborate, sodium tetraborate, and combinations thereof.

17. The process as claimed in claim 11, wherein the boron is provided to the carrier as at least one species comprising boric acid.

18. A catalyst prepared by the process according to claim 1.

19. A catalyst prepared by the process according to claim 11.

20. A process for the preparation of a carrier comprising: depositing boron on a carrier in a quantity of at least 200 ppmw, based on the weight of the carrier; and subsequently calcining the carrier, wherein the carrier comprises alpha-alumina.

21. The process as claimed in claim 20, wherein the boron is provided to the carrier as at least one species selected from the group consisting of boric acid, lithium tetraborate, lithium metaborate, ammonium tetraborate, sodium tetraborate, and combinations thereof.

22. The process as claimed in claim 20, wherein the boron is provided to the carrier as at least one species comprising boric acid.

23. The process as claimed in claim 20, wherein boron is deposited on the carrier in a quantity of at least 1000 ppmw boron, based on the weight of the carrier.

24. The process as claimed in claim 20, wherein the carrier is calcined at a temperature of at least 500° C.

25. The process as claimed in claim 20, wherein the carrier is calcined at a temperature of at most 750° C.

26. A calcined carrier prepared by the process according to claim 20.

27. A process for the epoxidation of an olefin comprising reacting olefin with oxygen in the presence of a catalyst prepared according to claim 1.

28. A process for the epoxidation of an olefin comprising reacting olefin with oxygen in the presence of a catalyst prepared according to claim 11.

29. A process for the production of a 1,2-diol, a 1,2-diol ether or an alkanolamine comprising converting an olefin oxide into the 1,2-diol, the 1,2-diol ether or the alkanolamine wherein the olefin oxide has been prepared by a process for the epoxidation of an olefin as claimed in claim 27.

30. A process for the production of a 1,2-diol, a 1,2-diol ether or an alkanolamine comprising converting an olefin oxide into the 1,2-diol, the 1,2-diol ether or the alkanolamine wherein the olefin oxide has been prepared by a process for the epoxidation of an olefin as claimed in claim 28.

* * * * *